No. 713,459. Patented Nov. 11, 1902.
H. H. LARSEN.
HARROW.
(Application filed Apr. 14, 1902.)
(No Model.) 2 Sheets—Sheet 1.

No. 713,459. Patented Nov. 11, 1902.
H. H. LARSEN.
HARROW.
(Application filed Apr. 14, 1902.)

(No Model.) 2 Sheets—Sheet 2.

WITNESSES:

INVENTOR
Hans H. Larsen
BY
ATTORNEYS

UNITED STATES PATENT OFFICE.

HANS HENRY LARSEN, OF CROOKSTON, MINNESOTA.

HARROW.

SPECIFICATION forming part of Letters Patent No. 713,459, dated November 11, 1902.

Application filed April 14, 1902. Serial No. 102,773. (No model.)

*To all whom it may concern:*

Be it known that I, HANS HENRY LARSEN, a subject of the King of Denmark, residing in Crookston, in the county of Polk and State of Minnesota, have invented new and useful Improvements in Harrows, of which the following is a full, clear, and exact description.

My invention relates to improvements in agricultural implements similar to harrows, although some of the features thereof may be utilized in the construction of other types of agricultural devices, such as cultivators or the like.

In my present implement I have sought to improve upon the construction disclosed by prior Letters Patent of the United States, No. 659,536, issued to me on October 9, 1900, by making provision for the operation of the front and rear axles by a single adjusting-lever having operative connection with both axles, by constructing the axles so as to bring the running wheels within the limits of the frame at the corners thereof, and to group and assemble the middle rank of teeth in such a way that the operation of the individual teeth does not interfere with other teeth of the same rank or with teeth of the ranks in front or rear thereof.

With these ends of view the invention consists in the novel construction, arrangement, and adaptation of parts, which will be hereinafter fully described, and the actual scope of the invention will be defined by the claims.

Reference is to be had to the accompanying drawings, forming a part of this specification, in which similar characters of reference indicate corresponding parts in both the figures.

Figure 1:
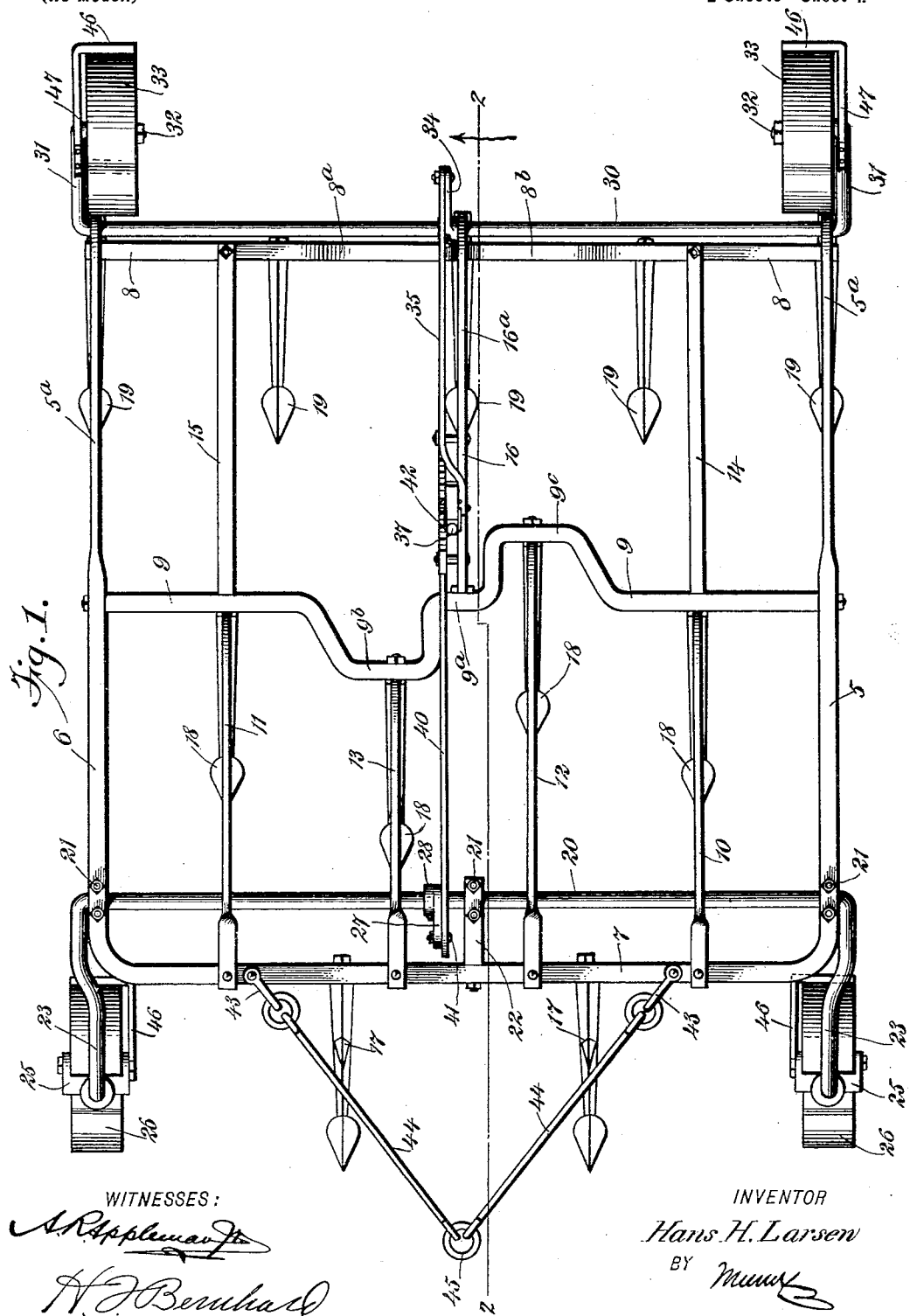
Figure 2:
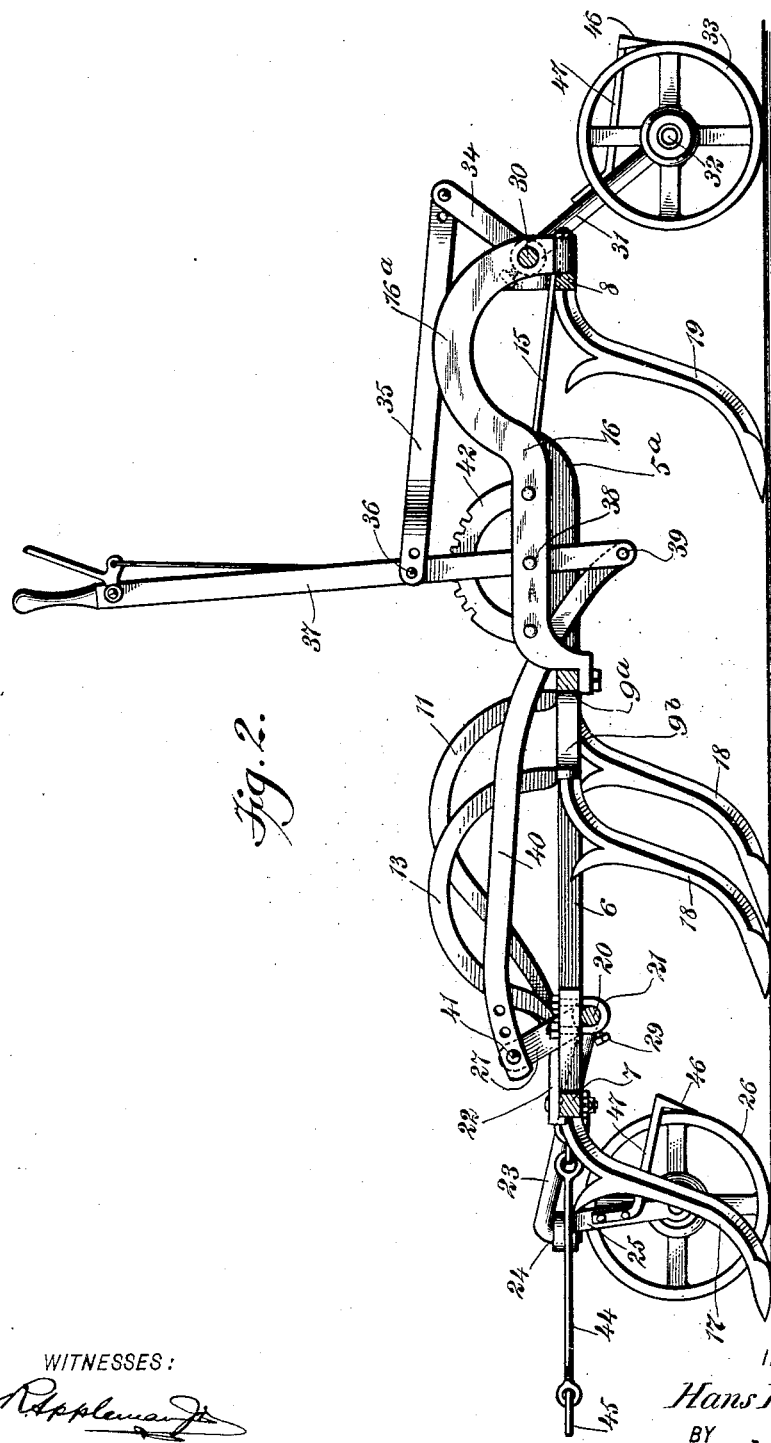

Figure 1 is a plan view of the harrow embodying my improvements; and Fig. 2 is a longitudinal sectional elevation thereof, taken in the plane of the dotted line 2 2 of Fig. 1.

The general framework of the machine consists of the side bars 5 6, a front bar 7, a rear bar 8, and an intermediate cross-bar 9, all of which are arranged in the general way shown by Fig. 1 and united together in a substantial manner to produce a strong rigid structure. The side bars 5 6 are substantially parallel, and they are arranged for the front portions thereof to lie in horizontal planes, while the rear portions of the side bars are curved or arched in upward directions, as at $5^a$, said arched portions of the side bars being joined in a suitable way at the ends of the rear bar 8. The front bar 7 lies in the horizontal plane of the front portions formed by the side bars 5 6, and, if desired, this front bar may be in a single piece of metal with the front portions of the side bars. The rear bar 8 has arched portions $8^a$ $8^b$, which meet at the middle portion of the machine-frame. The intermediate cross-bar 9 is situated, preferably, equidistant between the front and rear bars 7 8, and said intermediate bar has a forwardly-extending cranked portion $9^b$ and a rearwardly-extending cranked portion $9^c$, said cranked portions being located on opposite sides of an intermediate straight portion $9^a$ of the cross-bar. The end portions of this intermediate cross-bar 9 are united to the side bars 5 6 by any suitable means, and the straight end portions of said cross-bar are braced by the stay-bars 10 11, which lie between the front cross-bar 7 and said intermediate cross-bar 9. The stay-bars 10 11 are arched or curved upwardly, as shown by Fig. 2, and said bars are twisted near their front ends, so that they may overlap the front bar 7, whereby the front ends of the stay-bars may be fastened to the front bar, while the rear ends of the stay-bar can be bolted to the straight end portions of the intermediate bar 9. The rearwardly-extending cranked portion $9^c$ of the cross-bar is braced by another stay-bar 12, which is arched or curved and has its end portions bolted to the front bar 7 and said cranked portion $9^c$. In like manner the forwardly-extending cranked portion $9^b$ of said cross-bar is braced by an arched stay-bar 13, which is arranged and secured in the manner similar to the stay-bar 12, all as more clearly shown by Fig. 1.

It will be noted that the stay-bars 10, 11, 12, and 13 extend between the intermediate bar and the front bar; but I also provide braces or stays 14 15 16 between this intermediate bar 9 and the rear bar 8. The stay-bars 14 and 15 are flat straight bars arranged in alinement with the arched stay-bars 10 11 and having their end portions bolted to the straight portions of the bars 8 9. The other brace or stay 16 has its end portions secured to the straight middle portion $9^a$ of the intermediate bar and to the meeting-points of the arches 8ᵃ 8ᵇ of the rear bar 8, said bar 16 having the upwardly-arched portion 16ᵃ, as shown by Fig. 2.

The cross-bars 7 8 9 support the ranks of teeth (indicated at 17 18 19) and which are secured to the front, intermediate, and rear bars 7 9 8, respectively. These teeth are constructed similarly to the teeth disclosed in my prior patent, and they are fastened to the respective bars in a similar way, although it will be understood that I do not limit myself to the particular type of teeth or to any particular way of fastening them to a cross-bar. I desire, however, to call special attention to the fact that the teeth 18 of the second rank are fastened to the forwardly-extending cranked portion 9ᵇ, to the rearwardly-extending cranked portion 9ᶜ, and to the straight end portions of the intermediate bar 9, thus disposing the teeth of the second rank in the staggered order represented by Fig. 1, and thereby making the teeth partake of operative positions, whereby the individual teeth of the second rank will not interfere with either teeth of the same rank or with the teeth of the front and rear ranks.

20 designates the forward axle, which is journaled in suitable bearings 21, attached to the side bars 5 6 and to a short arm 22, said arm being fastened to the front bar 7 and extending rearwardly a suitable distance therefrom. (See Fig. 1.) The end portions of this front axle are bent or otherwise provided with depending crank-arms 23, which lie very close to the side bars of the frame, and the end portions of these crank-arms are bent to form the pintles 24. On said pintles of the crank-arm are loosely swiveled or sleeved the hangers 25 for the front running wheels 26, and these hangers are arranged to turn on vertical axes afforded by the pintles 24, and thus permit the hangers and the wheels to turn freely in horizontal planes. The cranked axle has its arms 23 bent, so as to bring the wheel-hangers and the running wheels practically within the limits of the side bars 5 6. This front axle is provided with an upstanding arm 27, which is provided with a hub 28 and is adapted to be clamped in place by a suitable set-screw 29.

30 designates the rear axle, which is disposed in rear of the bar 8 and in a plane above the same, said axle having its end portions bent or otherwise provided with the depending arms 31. This axle is journaled in suitable openings provided in the arched portions 5ᵃ of the side bars 5 6 and in the arched portion 16ᵃ of the rear brace-bar 16. The crank-arms 31 of said rear axle are bent to form wheel-spindles 32, on which are mounted the running wheels 33, and these running wheels lie within the planes of the side bars 5 6, and they are adapted to be brought below the rear cross-bar 8 by swinging the crank-arms 31 in a forward direction. This rear axle is also provided with an upstanding arm 34, to which is pivoted the rear portion of a forwardly-ranging link 35, the latter having an adjustable connection, as at 36, with an upright hand-lever 37. This lever is fulcrumed, as at 38, to the brace-bar 16, and to the lower portion of said lever is pivoted, as at 39, a forwardly-extending link 40, the latter having an adjustable connection, as at 41, with the upstanding arm 27 on the front axle 20.

It will be observed that the lever 37 has operative connection by the links 35 40 with the two axles and that a movement of the lever in a forward direction will serve to rock both of the axles in a manner to swing the crank-arms and the running wheels inwardly and below the frame, whereby the frame may be raised a distance according to the adjustment of the lever. Said lever, as is usual, is provided with a suitable locking-detent (not shown) adapted for engagement with a toothed or notched segment 42, which is secured to the front portion of the brace-bar 16.

It will also be observed that the locking device for the lever may be disengaged from the segment in order that the lever may be moved in a backward direction, thus adjusting the axles in order to swing the running wheels away from the frame, thus lowering the frame and permitting the teeth to enter the soil deeper.

Any suitable form of draft device may be employed—as, for example, the clevises 43, attached to the front bar 7 and having the links 44 connected thereto, said links being united by the coupling-link 45.

The harrow as thus far described may be used as a one-horse implement; but, if desired, a number of these harrows may be connected operatively together, so as to form a compound implement adapted to be drawn by three or more horses.

I prefer to equip the implement with scrapers 46, having the fastening-arms 47. Said scrapers are arranged adjacent to the peripheries of the wheels, and the scrapers for the rear wheels are fastened to the crank-arms 31, while the front-wheel scrapers have their arms attached to the hangers 25.

Having thus described my invention, I claim as new and desire to secure by Letters Patent—

1. In a harrow, a frame comprising side bars, end bars, an intermediate bar secured to the side bars and provided with forwardly and rearwardly cranked portions located on opposite sides of the longitudinal axis of the frame, and arched bars secured to the end and intermediate bars, combined with teeth secured to the cranked intermediate bar and the end bars, suitable running wheels, and means for adjusting the running wheels.

2. In a harrow, a frame comprising side bars, end bars, an intermediate bar, and arched bars secured to the intermediate and end bars, combined with an adjusting-lever fulcrumed on one of said arched bars, a rear axle journaled in arched bars at the rear portion of the frame and provided with crank-arms, a front axle journaled on the side bars and provided with crank-arms, wheel-hangers swiveled on the crank-arms of the front axle and carrying running wheels, other running wheels mounted on the arms of the rear axle, and links connecting said lever with the front and rear axles; all of said running wheels being disposed in line with the side bars of said frame.

3. A harrow-frame having front, rear, and parallel side bars, an intermediate cross-bar secured to the side bars and provided with forwardly and rearwardly extending cranked portions disposed on opposite sides of the middle of the frame, and arched braces fastened to the front, rear, and intermediate bars of the frame, combined with teeth secured to the cross-bars, a lever fulcrumed on an arched brace in rear of the intermediate cranked bar, rock-shafts carrying suitable wheels, and links connected to said lever and the rock-shafts.

In testimony whereof I have signed my name to this specification in the presence of two subscribing witnesses.

HANS HENRY LARSEN.

Witnesses:
GUS. N. GRADY,
ARNOLD R. HOLSTON.